Patented Jan. 8, 1952

2,581,443

UNITED STATES PATENT OFFICE 2,581,443

PREPARATION OF N-SUBSTITUTED NITROGEN HETEROCYCLIC BASES

Delbert D. Reynolds and William O. Kenyon, Rochester, N. Y., assignors to Eastman Kodak Company, Rochester, N. Y., a corporation of New Jersey No Drawing. Application August 15, 1949, Serial No. 110,468

9 Claims. (Cl. 260—247)

This invention relates to N-substituted nitrogen heterocyclic bases of the piperidine series, the pyrrolidine series and the morpholine series and to a process for their preparation.

It is known that various N-substituted heterocyclic bases can be prepared by ring closure of aliphatic compounds. For example, N-substituted piperidines have been prepared by reacting 1,5-dibromopentane with primary amines, N-substituted morpholines have been prepared by heating alkyl-, aryl- or aralkyl-bis-($\beta$-hydroxyethyl)-amines with concentrated hydrochloric acid and N-substituted pyrrolidines have been prepared by heating N-bromo butylamines with sulfuric acid [Beilstein, Org. Chemie, 4th edition, 20, pages 4 and 16 (1935); ibid., 27, page 6 (1937)]. It has also been proposed to prepare N-substituted piperidines by converting various glycols to their oxides and then reacting the oxides with primary amines in the presence of aluminum oxide at elevated temperatures, for example, N-ethyl piperidine from pentamethylene oxide and ethylamine, and pyrrolidine derivatives from tetramethylene oxide and primary amines [Yu K. Yur'ev et al., Chemical Abstracts 33, page 7779 (1939)].

We have now found that N-substituted nitrogen heterocyclic bases can be prepared in relatively high yields by a new ring closure method which comprises condensing disulfonates of dihydric aliphatic alcohols, wherein the sulfonate groups in each compound are separated from one another by 4 or 5 intervening carbon atoms in a chain or by 4 intervening carbon atoms bridged by an atom of oxygen with primary amines to give N-substituted nitrogen heterocyclic bases of the piperidine pyrrolidine and morpholine series which can be represented by the following general formula:

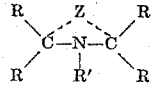

wherein each R represents an atom of hydrogen or an alkyl group containing from 1 to 2 carbon atoms (e. g. methyl and ethyl), $R_1$ represents an alkyl group containing from 1 to 4 carbon atoms (e. g. methyl, ethyl, n-propyl, isopropyl, n-butyl, etc.), an alkenyl group containing from 3 to 4 carbon atoms (e. g. allyl, methallyl or crotyl), an aryl group of the benzene series containing from 6 to 8 carbon atoms (e. g. phenyl, tolyl, xylyl, etc.), an aryl group of the naphthalene series containing from 10 to 12 carbon atoms (e. g. naphthyl, 4-methyl-1-naphthyl, 1,4-dimethyl-1-naphthyl, etc.), an aralkyl group of the arylated alkyl series (e. g. benzyl, $\alpha$-phenylethyl or $\beta$-phenylethyl) or a cycloalkyl group containing from 5 to 6 carbon atoms (e. g. cyclopentyl and cyclohexyl) and Z represents the non-metallic atoms necessary to complete a heterocyclic nucleus of the piperidine series, a heterocyclic nucleus of the pyrrolidine series or a heterocyclic nucleus of the morpholine series. On completion of the reaction of the primary amine with the disulfonate of a dihydric aliphatic alcohol, an alkali-metal hydroxide is added to the reaction mixture to obtain the free base, which is then separated from the reaction mixture by fractional distillation, crystallization or other means usual in separating products from their reaction mixtures. The above-defined N-substituted heterocyclic bases are valuable intermediates for the preparation of other chemical compounds, particularly as intermediates for the preparation of quaternary salts.

It is, accordingly, an object of the invention to provide a convenient and relatively rapid process for preparing N-substituted nitrogen heterocyclic bases of the piperidine, pyrrolidine and morpholine series. Other objects will become apparent hereinafter.

In accordance with the invention, the intermediate disulfonates of dihydric alcohols which can be represented by general formula:

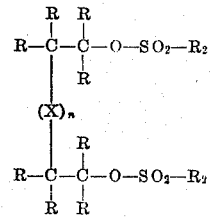

wherein R has the same meanings as previously defined, $R_2$ represents an alkyl group containing from 1 to 4 carbon atoms, particularly a primary alkyl group (e. g. methyl, ethyl, n-propyl, isopropyl, n-butyl, etc.), an aryl group of the benzene series containing from 6 to 8 carbon atoms (e. g. phenyl, tolyl, xylyl, etc.), an aryl group of the naphthalene series containing from 10 to 12 carbon atoms (e. g. naphthyl, 4-methyl-1-naphthyl, 2,6-dimethyl-1-naphthyl, etc.) or an aralkyl group of the arylated alkyl series containing from 7 to 8 carbon atoms (e. g. benzyl or $\beta$-phenylethyl), $n$ represents zero or 1 and X represents an atom of oxygen or a methylene group, can be prepared by reacting dihydric aliphatic alcohols selected from those wherein the two hydroxyl groups are separated by a chain of 4 or 5 intervening carbon atoms which can be substituted by alkyl groups, or, the hydroxyl groups are separated by a chain of 4 carbon atoms bridged by an oxygen atom (e. g. containing the group

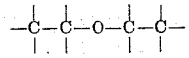

which can also be C-alkyl substituted), with various organic sulfonyl chlorides. While any sulfonyl chloride can be employed having the general formula:

$$R_2SO_2Cl$$

wherein $R_2$ has the same meanings as previously defined, benzene sulfonyl chloride is the preferred sulfonating agent. Specifically, the disulfonates of dihydric aliphatic alcohols, i. e., [di-(sulfonoxy)alkanes], which are included as intermediates are the di-(methane sulfonate), di-(ethane sulfonate), di-(n-propane sulfonate), di-(isopropane sulfonate), di-(n-butane sulfonate), di-(isobutane sulfonate), di-(sec. butane sulfonate), di-(benzene sulfonate), di-(o-toluene sulfonate), di-(p-toluene sulfonate), di-(m-toluene sulfonate), di-(xylene sulfonates), di-(naphthalene sulfonates), di-(methylnaphthalene sulfonates), di-(dimethylnaphthalene sulfonates), di-(benzyl sulfonate), di-(β-phenylethane sulfonate), and the like, of dihydric alcohols including 1,4-pentanediol, 1,5-pentanediol, 2-methyl butanediol-1,4, 1,5-hexanediol, 2,5-hexanediol, 2-methyl pentanediol-2,5, 2,2-dimethyl butanediol-1,4, 2-methyl hexanediol-2,6, 2,2-dimethyl pentanediol-1,5, 2-methyl heptanediol-2,6, 2,5-dimethyl hexanediol-2,5, 2,2,4-trimethyl pentanediol-1,4, 2,6-dimethyl heptanediol-2,6, 3-methyl-6-ethyl octonediol-3,6-diethylene glycol, dipropylene glycol $$[(CH_3 \cdot CHOH \cdot CH_2)_2O]$$

etc.

The primary amines which are suitable in the condensation reaction with the mentioned disulfonates of dihydric aliphatic alcohols to give the N-substituted nitrogen heterocyclic bases of the invention can be represented by the general formula:

$$R_1—NH_2$$

wherein $R_1$ has the same meanings as previously defined. Typical primary amines include the alkylamines containing from 1 to 4 carbon atoms (e. g. methylamine, ethylamine, n-propylamine, isopropylamine, and n-butylamine, isobutylamine sec. butylamine), alkenylamines containing from 3 to 4 carbon atoms (e. g. allylamine, methallylamine and crotylamine), arylamines of the benzene series containing from 6 to 8 carbon atoms (e. g. aniline, p-toluidine, o-toluidine, m-toluidine and the xylidines), arylamines of the naphthalene series containing from 10 to 12 carbon atoms (e. g. α-naphthylamine, β-naphthylamine, 1-methyl-4-aminonaphthalene, 1,4-dimethyl-2-aminonaphthalene, etc.), aralkylamines containing from 7 to 8 carbon atoms (e. g. benzylamine, α-phenylethylamine and β-phenylethylamine) and cycloalkylamines containing from 5 to 6 carbon atoms (e. g. cyclopentylamine and cyclohexylamine).

The amount of the primary amine employed is in the proportion of at least 3-gram-moles of the amine to each gram-mole of the disulfonate of the dihydric aliphatic alcohol, although several times this amount can be used, if desired. However, no particular advantage results from using a large excess of the primary amine. Advantageously, the reaction of the primary amine with the disulfonate compound is carried out in an inert solvent medium having a boiling point in the range of 60° to 190° C., in which the disulfonate compound is soluble, for example, in cyclic ethers such as the furans (e. g. tetrahydrofuran, methyl furan, dimethyl furan, etc.), cyclic ethers of glycols containing 5 or 6 members in the ring (e. g. 1,3-dioxane, dimethyl dioxane, dioxolane, 4-methyl dioxolane, and particularly 1,4-dioxane), dialkyl ethers containing from 6 to 8 carbon atoms (e. g. isopropyl ether, and butyl ether), dialkyl ethers of ethylene glycol containing from 4 to 8 carbon atoms (e. g. dimethyl ether of ethylene glycol, diethyl ether of ethylene glycol, etc.), diethyl ether of diethylene glycol and benzene, and similar solvent media. The concentration of the reactants in the reaction media is not critical, since any practical concentration is effective, but preferably in the concentration of from 1 to 20 parts by weight of the reactants to each 100 parts by weight of the reaction media. The temperature of the reaction of the primary amine with the disulfonate of the dihydric aliphatic alcohol can vary from 60° to 190° C., but preferably in the range of 80° to 125° C. The alkali-metal hydroxide (e. g. sodium hydroxide, potassium hydroxide, lithium hydroxide, etc.) need be present only in an amount just sufficient to combine with all of the sulfonic acid groups liberated in the reaction, that is, at least 2 gram-moles of the alkali-metal hydroxide to each gram-mole of the disulfonate of the dihydric aliphatic alcohol, but preferably in an amount in excess and up to 6 gram-moles or even more, if desired, of the alkali-metal hydroxide to each gram-mole of the disulfonate compound.

The following examples will serve further to illustrate the N-substituted nitrogen heterocyclic bases of the invention and the process of preparing the same.

*Example 1.—Di-(methane sulfonate) of 1,5-pentanediol*

104 grams (1 mole) of 1,5-pentanediol were dissolved in one liter of pyridine and the solution cooled to about 5° C. To the solution, there were then added slowly 275 grams (2.4 moles) of methane sulfonyl chloride, while maintaining the temperature of the reaction mixture between 0° and 10° C. The mixture was stirred an additional hour and then poured into rapidly stirred ice water. The solid thus obtained was recrystallized from ethanol. It had a melting point of 35°–36° C. and was identified as di-(methane sulfonate) of 1,5-pentanediol, that is, 1,5-di-(methane sulfonoxy) pentane, represented by the structural formula:

CH₃—SO₂—O—CH₂—CH₂—CH₂—
                            CH₂—CH₂—O—SO₂—CH₃

By substituting for the methane sulfonyl chloride in the above example an equivalent amount of benzene sulfonyl chloride, there is obtained di-(benzene sulfonate) of 1,5-pentanediol, that is, 1,5-di-(benzene sulfonoxy) pentane, represented by the structural formula:

C₆H₅—SO₂—O—CH₂—CH₂—CH₂—
                           CH₂—CH₂—O—SO₂—C₆H₅

Example 2.—Di-(benzene sulfonate) of 2,5-hexanediol 590 grams (5 moles) of 2,5-hexanediol were cooled to about 5° C. in 2 liters of anhydrous pyridine. To this solution there were added 1900 grams (10.8 moles) of benzene sulfonyl chloride over a period of 4 hours, during which time the temperature was kept within the range of 0° to 10° C. The reaction mixture was stirred during the addition and then for an additional hour, after which the mixture was poured rapidly into stirred ice water. There was obtained 1300 grams of air-dried product which on recrystallization from ethanol melted at 104°–105° C. and was identified as di-(benzene sulfonate) of 2,5-hexanediol, that is, 2,5-di-(benzene sulfonoxy) hexane, represented by the structural formula:

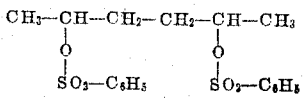

Example 3.—Di-(benzene sulfonate) of 1,4-butanediol 360 grams (4 moles) of 1,4-butanediol were cooled to 5° C. in 2 liters of pyridine. To this solution there were added 1600 grams (9.1 moles) of benzene sulfonyl chloride over a period of about 4 hours, the temperature being kept during this time in the range of 0° to 10° C. The reaction mixture was stirred for the entire addition time and then for an additional hour, after which the mixture was poured rapidly into stirred ice water. The solid product which separated was washed with water, air dried and then recrystallized from ethanol. Analysis indicated that the product was di-(benzene sulfonate) of 1,4-butanediol, that is, 1,4-di-(benzene sulfonoxy) butane, represented by the structural formula:

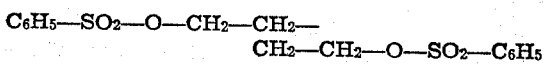

The preceding examples are illustrative of the general process for preparing the intermediate disulfonates of dihydric aliphatic alcohols. By employing the same general process with equivalent amounts of the various other organic sulfonyl chlorides and various other dihydric alcohols previously mentioned as suitable, there can be prepared all the glycol disulfonate intermediates coming within the invention.

Example 4.—N-butyl piperidine 192 grams (0.5 mole) of the di-(benzene sulfonate) of 1,5-pentanediol were dissolved in 500 c. c. of anhydrous dioxane and heated to reflux under a column equipped with a variable take-off head. There were then added to the solution 110 grams (1.5 moles) of n-butylamine, dropwise over a period of approximately 2 hours. A portion of the dioxane was then distilled off and 60 grams of sodium hydroxide dissolved in 200 c. c. of water were added. The reaction mixture was again subjected to distillation, until the volume had been reduced to approximately one-half, when the salt which had formed was removed by filtration and the filtrate then further distilled. The portion distilling at 120° to 175° C. was collected and redistilled to give 35 grams of N-butyl piperidine having a boiling point of 174°–175° C. Analysis of the product gave 9.6% by weight of nitrogen as compared with calculated for $C_9H_{19}N$ of 9.9%, indicating thereby that a substantially pure N-butyl piperidine had been obtained.

Example 5.—N-cyclohexyl piperidine 192 grams (0.5 mole) of the di-(benzene sulfonate) of 1,5-pentanediol were heated to reflux with 500 c. c. of anhydrous dioxane as in Example 1. To the mixture there were added dropwise over a period of approximately 4 hours, 150 grams (1.52 moles) of cyclohexylamine. When the addition of the amine was completed, there were then added to the reaction mixture 60 grams of sodium hydroxide dissolved in water. Distillation was continued until about one-half of the volume of the mixture had been removed. The reaction mixture was then cooled, ether was added and the mixture filtered. The filtrate was then subjected to fractional distillation and a portion of 78 grams collected, which upon redistillation yielded 67 grams of N-cyclohexyl piperidine boiling at 234° C. Analysis of this product gave 8.35% by weight of nitrogen as compared with calculated for $C_{11}H_{21}N$ of 8.38% by weight of nitrogen.

Example 6.—N-phenyl piperidine 192 grams (0.5 mole) of the di-(benzene sulfonate) of 1,5-pentanediol were heated to reflux with 500 c. c. of anhydrous dioxane as in Example 1. There were then added dropwise to the solution 140 grams (1.5 moles) of freshly distilled aniline. Then 60 grams of sodium hydroxide dissolved in 150 c. c. of water were added to the reaction mixture. Upon cooling, the reaction mixture separated into two layers. The upper layer was separated and mixed with ether and the whole washed with water. The ether layer was then fractionally distilled to give 53 grams of N-phenyl piperidine which had a boiling point of 152°–154° C. and on analysis showed 8.8% by weight of nitrogen as compared with calculated of 8.7% by weight of nitrogen.

Example 7.—N-allyl piperidine 192 grams (0.5 mole) of the di-(benzene sulfonate) of 1,5-pentanediol were heated to reflux with 500 c. c. of anhydrous dioxane. 90 grams (1.58 moles) of allylamine were added dropwise over a period of approximately 3 hours. 60 grams of sodium hydroxide dissolved in 150 c. c. of water were then added, and a portion of the dioxane was removed by distillation. The remaining reaction mixture was cooled, filtered and then extracted with ether. The ether extract was then distilled and N-allyl piperidine having a boiling point of 151° to 152° C. was obtained.

Example 8.—N-ethyl pyrrolidine 185 grams (0.5 mole) of the di-(benzene sulfonate) of 1,4-butanediol were heated to reflux in one liter of anhydrous benzene. While the reaction mixture was refluxing, 100 grams (2.2 moles) of anhydrous ethylamine were added dropwise over a 40-minute period. The reaction mixture was refluxed for two more hours, after which time 60 grams of sodium hydroxide in water were added. The mixture was then cooled, washed with water, and the benzene layer which separated was dried over anhydrous calcium sulfate. The benzene layer on being fractionally distilled yielded N-ethyl pyrrolidine having a boiling point of 107° to 108° C.

Example 9.—N-phenyl pyrrolidine 185 grams (0.5 mole) of the di-(benzene sulfonate) of 1,4-butanediol were refluxed in one liter of anhydrous benzene while 140 grams (1.5 moles) of aniline were added dropwise over a period of about 40 minutes. The reaction mixture was then refluxed for an additional hour and 60 grams of sodium hydroxide dissolved in water was added. The reaction mixture was then cooled, washed with water and the benzene layer was then dried over anhydrous magnesium sulfate. Upon distillation of the dried benzene solution, there were obtained 56 grams of N-phenyl pyrrolidine which had a boiling point of 100° C. at 6 mm. pressure.

*Example 10.—N-benzyl pyrrolidine*

185 grams (0.5 mole) of the di-(benzene sulfonate) of 1,4-butanediol were heated to reflux in 600 c. c. of anhydrous benzene plus 600 c. c. of anhydrous dioxane. 161 grams (1.5 moles) of benzylamine were added dropwise to the reaction mixture over a period of about one hour. The reaction mixture was refluxed for an additional hour and 60 grams of sodium hydroxide dissolved in water was then added. The reaction mixture was cooled, filtered and the residue washed with ether. The ether washings were added to the filtrate and the latter was then distilled, until more salt had separated. The salt was removed by refiltering, after which the filtrate was fractionally distilled to give 50 grams of N-benzyl pyrrolidine which had a boiling point of 81° to 82° C. at 5 mm. pressure. Analysis of this product gave 8.9% by weight of nitrogen as compared with the calculated value for $C_{11}H_{15}N$ of 8.7% by weight of nitrogen.

*Example 11.—N-butyl a,a'-dimethyl pyrrolidine*

199 grams (0.5 mole) of the di-(benzene sulfonate) of 2,5-hexanediol were heated to reflux with 500 c. c. of anhydrous dioxane. To this solution, there were then added dropwise 110 grams (1.5 moles) of n-butylamine, and the refluxing continued for an additional 3 hours. A portion of the dioxane was removed by distillation and then 60 grams of sodium hydroxide in water added. The reaction mixture was then cooled, extracted with ether and the ether layer subjected to fractional distillation. There were obtained 30 grams of N-butyl a,a'-dimethyl pyrrolidine having a boiling point of 176°–178° C. Analysis of this product gave 8.8% by weight of nitrogen, as compared with calculated value of 9.0% by weight of nitrogen.

*Example 12.—N-cyclohexyl a,a'-dimethyl pyrrolidine*

199 grams (0.5 mole) of the di-(benzene sulfonate) of 2,5-hexanediol were refluxed in 500 c. c. of anhydrous dioxane while 150 grams (1.5 moles) of cyclohexylamine were added dropwise over a period of about 3 hours. 60 grams of sodium hydroxide dissolved in water were then added and the reaction mixture cooled. Ether was added to the mixture and the salts which precipitated were removed by filtration. The ether solution was then fractionated to yield 24 grams of N-cyclohexyl a,a'-dimethyl pyrrolidine having a boiling point of 231° to 233° C. Analysis gave 7.8% by weight of nitrogen.

*Example 13.—N-butyl morpholine*

193 grams (0.5 mole) of the di-(benzene sulfonate) of diethylene glycol were heated to reflux temperature in 500 c. c. of anhydrous dioxane and 110 grams (1.5 moles) of n-butylamine were added dropwise to the solution over a period of 5 hours. 300 c. c. of dioxane were then removed from the reaction mixture by distillation and 60 grams of sodium hydroxide in water were added. The reaction mixture was then cooled and the salts which separated were removed by filtration. The filtrate on distillation yielded 50 grams of N-butyl morpholine having a boiling point of 181° C. Analysis of this product gave 10.0% by weight of nitrogen, as compared with calculated value of 9.8% by weight of nitrogen.

*Example 14.—N-benzyl morpholine*

A solution of 193 grams (0.5 mole) of diethylene glycol di-(benzene sulfonate) in 1200 c. c. of anhydrous dioxane were refluxed while 161 grams (1.5 moles) of benzylamine were added dropwise. The reaction mixture was refluxed for an additional hour. Then 60 grams of sodium hydroxide in 500 c. c. of water were added slowly to the reaction mixture. Most of the water and dioxane were then removed by distillation. The residual mixture was cooled, ether added, and the insoluble salt which formed was removed by filtration. The filtrate was distilled, and after removing ether, water and dioxane, there were obtained 80 grams of N-benzyl morpholine which had a boiling point of 78°–79° C. at 2 mm. pressure and contained 8.0% by weight of nitrogen, as compared with calculated for $C_{11}H_{15}NO$ of 7.9% by weight nitrogen value.

Although the preceding examples describe the preparation of but relatively few N-substituted nitrogen heterocyclic bases, it will be understood that the process is likewise applicable for the preparation of other closely related bases. For example, the various 1,5-pentanediol disulfonates, the 1,5-hexanediol disulfonates, the 2-methyl hexanediol-2,6 disulfonates, the 2,2-dimethyl pentanediol-1,5 disulfonates, the 2-methyl heptanediol-2,6 disulfonates and the 2,6-dimethyl heptanediol-2,6 disulfonates on reaction with the mentioned primary amines give the corresponding N-substituted nitrogen heterocyclic bases of the piperidine series. The various 2,5-pentanediol disulfonates, 2,5-hexanediol disulfonates, the 2-methyl butanediol-1,4 disulfonates, the 2,2-dimethyl butanediol-1,4 disulfonates, the 2,5-dimethyl hexanediol-2,5 disulfonates, the 2,2,4-trimethyl pentanediol-1,4 disulfonates and the 3-methyl-6-ethyl octanediol-3,6 disulfonates on reaction with the mentioned primary amines give the corresponding N-substituted nitrogen heterocyclic bases of the pyrrolidine series. The various diethylene glycol disulfonates

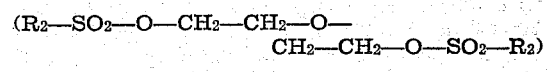

and C-alkyl substituted derivatives such as dipropylene glycol disulfonates

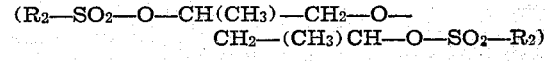

wherein $R_2$ has the same definition as previously given, on reaction with the mentioned primary amines give the corresponding N-substituted nitrogen heterocyclic bases of the morpholine series. All of the above-mentioned N-substituted nitrogen bases are valuable intermediates for the preparation of other chemical compounds, particularly as intermediates for the preparation of corresponding quaternary salts.

What we claim is:

1. A process for preparing an N-substituted nitrogen heterocyclic base selected from the group consisting of an N-substituted piperidine, an N-substituted pyrrolidine, and an N-substituted morpholine, which comprises condensing a disulfonate compound represented by the following general formula:

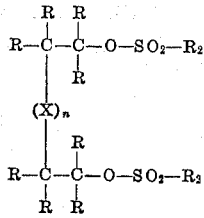

wherein R represents a member selected from the group consisting of an atom of hydrogen and a methyl group, $R_2$ represents a member selected from the group consisting of an alkyl group containing from 1 to 4 carbon atoms, a phenyl group, a tolyl group, a naphthyl group, a benzyl group, and a phenylethyl group, $n$ represents a member selected from the group consisting of zero and 1, and X represents a member selected from the group consisting of an atom of oxygen and a methylene group, with a primary amine having the general formula:

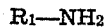

wherein $R_1$ represents a member selected from the group consisting of an alkyl group containing from 1 to 4 carbon atoms, an allyl group, a phenyl group, a benzyl group, and a cyclohexyl group, in the proportions of at least 3 gram-moles of the said primary amine to each gram-mole of the said disulfonate compound, adding to the reaction mixture an alkali-metal hydroxide in the proportions of at least 2 gram-moles of the said alkali-metal hydroxide to each gram-mole of the said disulfonate compound and separating the formed N-substituted nitrogen heterocyclic base from the reaction mixture.

2. A process for preparing an N-alkyl substituted piperidine which comprises condensing the di-(benzene sulfonate) of 1,5-pentanediol with a primary alkylamine containing from 1 to 4 carbon atoms, in the proportions of at least 3 gram-moles of the said primary alkylamine to each gram-mole of the said di-(benzene sulfonate) of 1,5-pentanediol, adding to the reaction mixture an alkali-metal hydroxide in the proportions of at least 2 gram-moles of the said alkali-metal hydroxide to each gram-mole of the said di-(benzene sulfonate) of 1,5-pentanediol and separating the formed N-alkyl substituted piperidine from the reaction mixture.

3. A process for preparing an N-alkyl substituted pyrrolidine which comprises condensing the di-(benzene sulfonate) of 1,4-butanediol with a primary alkylamine containing from 1 to 4 carbon atoms, in the proportions of at least 3 gram-moles of the said primary alkylamine to each gram-mole of the said di-(benzene sulfonate) of 1,4-butanediol, adding to the reaction mixture an alkali-metal hydroxide in the proportions of at least 2 gram-moles of the said alkali-metal hydroxide to each gram-mole of the said di-(benzene sulfonate) of 1,4-butanediol and separating the formed N-alkyl substituted pyrrolidine from the reaction mixture.

4. A process for preparing an N-alkyl substituted morpholine which comprises condensing the di-(benzene sulfonate) of diethylene glycol with a primary alkylamine containing from 1 to 4 carbon atoms, in the proportions of at least 3 gram-moles of the said primary alkylamine to each gram-mole of the said di-(benzene sulfonate) of diethylene glycol, adding to the reaction mixture an alkali-metal hydroxide in the proportions of at least 2 gram-moles of the said alkali-metal hydroxide to each gram-mole of the said di-(benzene sulfonate) of diethylene glycol and separating the formed N-alkyl substituted morpholine from the reaction mixture.

5. A process for preparing N-ethyl pyrrolidine which comprises condensing the di-(benzene sulfonate) of 1,4-butanediol, in a solvent media of benzene, with ethylamine, in the proportions of at least 3 gram-moles of the ethylamine to each gram-mole of the di-(benzene sulfonate) of 1,4-butanediol, adding sodium hydroxide to the reaction mixture in the proportions of at least 2 gram-moles of the sodium hydroxide to each gram-mole of the di-(benzene sulfonate) of 1,4-butanediol and separating the N-ethyl pyrrolidine from the reaction mixture.

6. A process for preparing N-butyl morpholine which comprises condensing the di-(benzene sulfonate) of diethylene glycol, in a solvent media of 1,4-dioxane, with n-butylamine, in the proportion of at least 3 gram-moles of the n-butylamine to each gram-mole of the di-(benzene sulfonate) of diethylene glycol, adding sodium hydroxide to the reaction mixture in the proportions of at least 2 gram-moles of the sodium hydroxide to each gram-mole of the di-(benzene sulfonate) of diethylene glycol and separating the N-butyl morpholine from the reaction mixture.

7. A process for preparing N-butyl piperidine which comprises condensing di-(benzene sulfonate) of 1,5-pentanediol, in a solvent media of 1,4-dioxane, with n-butylamine, in the proportion of at least 3 gram-moles of the n-butylamine to each gram-mole of the di-(benzene sulfonate) of 1,5-pentanediol, then adding sodium hydroxide to the reaction mixture in the proportion of at least 2 gram-moles of the sodium hydroxide to each gram-mole of the di-(benzene sulfonate) of 1,5-pentanediol and then separating the N-butyl piperidine from the reaction mixture.

8. A process for preparing N-allyl piperidine which comprises condensing di-(benzene sulfonate) of 1,5-pentanediol, in a solvent media of 1,4-dioxane, with N-allylamine, in the proportion of at least 3 gram-moles of the alkylamine to each gram-mole of the di-(benzene sulfonate) of 1,5-pentanediol, then adding sodium hydroxide to the reaction mixture in the proportions of at least 2 gram-moles of the sodium hydroxide to each gram-mole of the di-(benzene sulfonate) of 1,5-pentanediol and then separating the N-allyl piperidine from the reaction mixture.

9. A process for preparing N-phenyl pyrrolidine which comprises condensing di-(benzene sulfonate) of 1,4-butanediol, in a solvent media of benzene, with aniline, in the proportion of at least 3 gram-moles of the aniline to each gram-mole of di-(benzene sulfonate) of 1,4-butanediol, then adding sodium hydroxide to the reaction mixture in the proportion of at least 2 gram-moles of the sodium hydroxide to each gram-mole of the di-(benzene sulfonate) of 1,4-butanediol and then separating the N-phenyl pyrrolidine from the reaction mixture.

DELBERT D. REYNOLDS.
WILLIAM O. KENYON.

(References on following page)

REFERENCES CITED

The following references are of record in the file of this patent:

UNITED STATES PATENTS

| Number | Name | Date |
|---|---|---|
| 1,919,301 | Morton | July 25, 1933 |
| 2,034,427 | Campbell | Mar. 17, 1936 |
| 2,041,854 | Neal | May 20, 1936 |
| 2,063,191 | Pray | Dec. 8, 1936 |
| 2,109,401 | Nicodemus et al. | Feb. 22, 1938 |
| 2,114,256 | Schenck | Apr. 12, 1938 |
| 2,129,805 | Wilson | Sept. 13, 1938 |
| 2,138,763 | Graves | Nov. 29, 1938 |
| 2,421,650 | Reppe et al. | June 3, 1947 |

FOREIGN PATENTS

| Number | Country | Date |
|---|---|---|
| 164,365 | Germany | Oct. 28, 1905 |

OTHER REFERENCES

Cerkovnikov et al.: Ber. der Deu. Chem., vol. 74, pp. 1648–1657 (1941).